United States Patent
Kuzdzal et al.

(10) Patent No.: US 12,510,094 B1
(45) Date of Patent: Dec. 30, 2025

(54) COUPLING JOINTS TO INTERCONNECT AND TRANSMIT ROTATIONAL TORQUE BETWEEN ADJACENT IMPELLER BODIES IN A TURBOMACHINE

(71) Applicant: Siemens Energy Global GmbH & Co. KG, Munich (DE)

(72) Inventors: Mark J. Kuzdzal, Allegany, NY (US); David J. Peer, Smethport, PA (US)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 18/877,277

(22) PCT Filed: Jul. 7, 2022

(86) PCT No.: PCT/US2022/036341
§ 371 (c)(1),
(2) Date: Dec. 20, 2024

(87) PCT Pub. No.: WO2024/010582
PCT Pub. Date: Jan. 11, 2024

(51) Int. Cl.
*F04D 29/28* (2006.01)
*F04D 17/12* (2006.01)
(Continued)

(52) U.S. Cl.
CPC ......... *F04D 29/286* (2013.01); *F04D 17/122* (2013.01); *F04D 29/083* (2013.01); *F04D 29/266* (2013.01)

(58) Field of Classification Search
CPC ............................. F04D 29/286; F04D 29/266
See application file for complete search history.

(56) References Cited

U.S. PATENT DOCUMENTS 2,861,823 A 11/1958 Perry
2,935,296 A 5/1960 Hockert et al.
(Continued)

FOREIGN PATENT DOCUMENTS

EP 2636845 A2 9/2013
WO 2021230869 A1 11/2021
WO 2021230874 A1 11/2021

OTHER PUBLICATIONS

PCT International Search Report and Written Opinion of International Searching Authority mailed Mar. 1, 2023 corresponding to PCT International Application No. PCT/US2022/036341 filed Jul. 7, 2022.

*Primary Examiner* — Courtney D Heinle
*Assistant Examiner* — John S Hunter, Jr.
(74) *Attorney, Agent, or Firm* — Enrique J. Mora

(57) ABSTRACT

Improved coupling joints configured to interconnect and transmit torque between adjacent impeller bodies in a turbomachine are provided. A plurality of impeller bodies is stacked on a tie bolt. A respective coupling joint is defined by features in adjacent impeller bodies to couple to one another the adjacent impeller bodies. The coupling joint involves a pair of corresponding axially engaging faces and a pair of corresponding radially engaging faces that define a coupling pilot fit. A torque transmitting arrangement is interposed between the axially engaging faces and radially engaging face. The pair of axially engaging faces in operation defines a compressed joint effective to form a seal between the pair of axially engaging faces to inhibit leakage of a process fluid being processed in the compressor section of the turbomachine. This allows elimination of separate seal arrangements, such as otherwise could involve sleeves with O-rings, etc.

18 Claims, 7 Drawing Sheets

(51) Int. Cl.
*F04D 29/08* (2006.01)
*F04D 29/26* (2006.01)

(56) References Cited

U.S. PATENT DOCUMENTS

| | | |
|---|---|---|
| 3,749,516 A | 7/1973 | Samurin et al. |
| 4,183,719 A | 1/1980 | Bozung |
| 8,967,960 B2 | 3/2015 | Guénard |
| 2015/0093247 A1 | 4/2015 | Asano et al. |

COUPLING JOINTS TO INTERCONNECT AND TRANSMIT ROTATIONAL TORQUE BETWEEN ADJACENT IMPELLER BODIES IN A TURBOMACHINE

BACKGROUND

Disclosed embodiments relate generally to the field of turbomachinery, and, more particularly, to improved coupling joints configured to interconnect and transmit torque between adjacent rotatable impeller bodies in a turbomachine.

Turbomachinery is used extensively in the oil and gas industry, such as for performing compression of a process fluid, conversion of thermal energy into mechanical energy, fluid liquefaction, etc. One example of such turbomachinery is a compressor, such as a centrifugal compressor.

DETAILED DESCRIPTION

Figure 1:
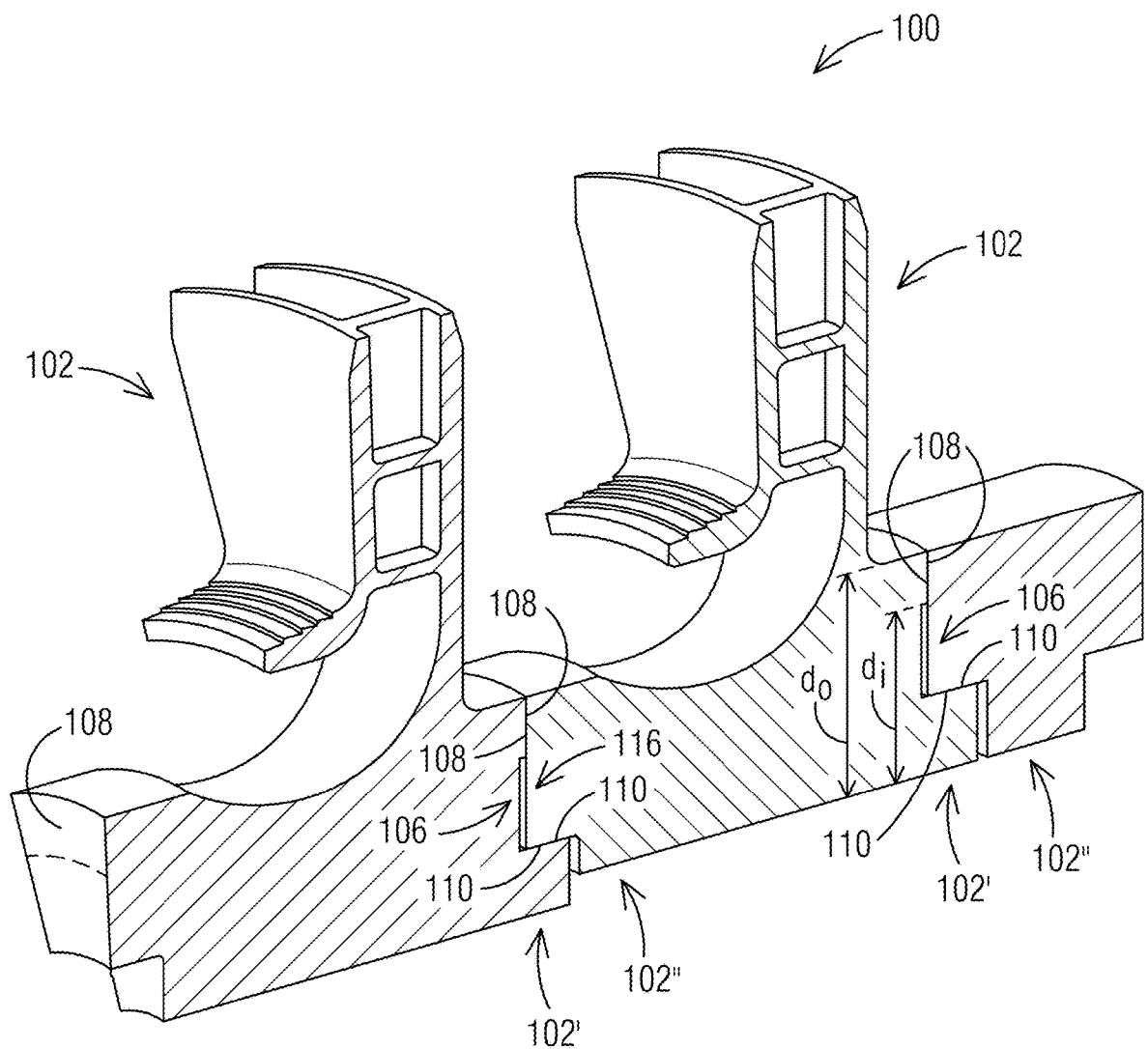
FIG. 1 is a fragmentary isometric view of one non-limiting embodiment of a portion of a rotor structure showing rotatable impeller bodies, as may be used in industrial applications involving turbomachinery, such as without limitation, compressors (e.g., centrifugal compressors, etc.).

As would be appreciated by those skilled in the art, turbomachinery, such as centrifugal compressors, may involve rotors of tie bolt construction (also referred to in the art as thru bolt or tie rod construction). The tie bolt is arranged to support a plurality of rotatable impeller bodies that, for example, in combination are arranged to form a compressor section of the turbomachine.

The inventors of disclosed embodiments have recognized that in certain known rotor designs involving a tie bolt, where the tie bolt, for example, may involve a substantial length and may further involve high rotational speeds, there may be certain technical challenges that can arise in connection with such a rotor structure, such as may involve tie bolt resonances and/or rotor imbalances caused by deflection or radial displacement of the tie bolt relative to the rotor structure.

Disclosed embodiments make use of improved coupling joints configured to interconnect and efficiently transmit rotational torque between adjacent impeller bodies in the turbomachine. Certain structures involved in disclosed embodiments (e.g., structures involving mutually engaging faces configured to in part form a coupling pilot fit, also referred in the art as a spigot fit) between the respective adjacent impeller bodies are effective to interconnect adjacent impeller bodies without involving Hirth couplings or curvic couplings. That is, disclosed embodiments can operate without Hirth couplings or curvic couplings to interconnect mutually adjacent impeller bodies.

Before any disclosed embodiments are explained in detail, it is to be understood that disclosed concepts are not limited in their application to the details of construction and the arrangement of components set forth in this description or illustrated in the following drawings. Disclosed concepts may be realized by way of other implementations and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality described as being carried out by certain system elements may be performed by one or more elements. Similarly, for instance, an element may be configured to perform functionality that may be described as being carried out by multiple elements. The numerous innovative teachings of the present application will be described with reference to exemplary non-limiting embodiments.

It should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" is intended to mean that an element in operation is in contact with a further element, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

FIG. 1 illustrates a fragmentary isometric view of one non-limiting embodiment of a disclosed rotor structure 100, as may be used in industrial applications involving turbomachinery, such as without limitation, compressors (e.g., centrifugal compressors, etc.).

Figure 2:
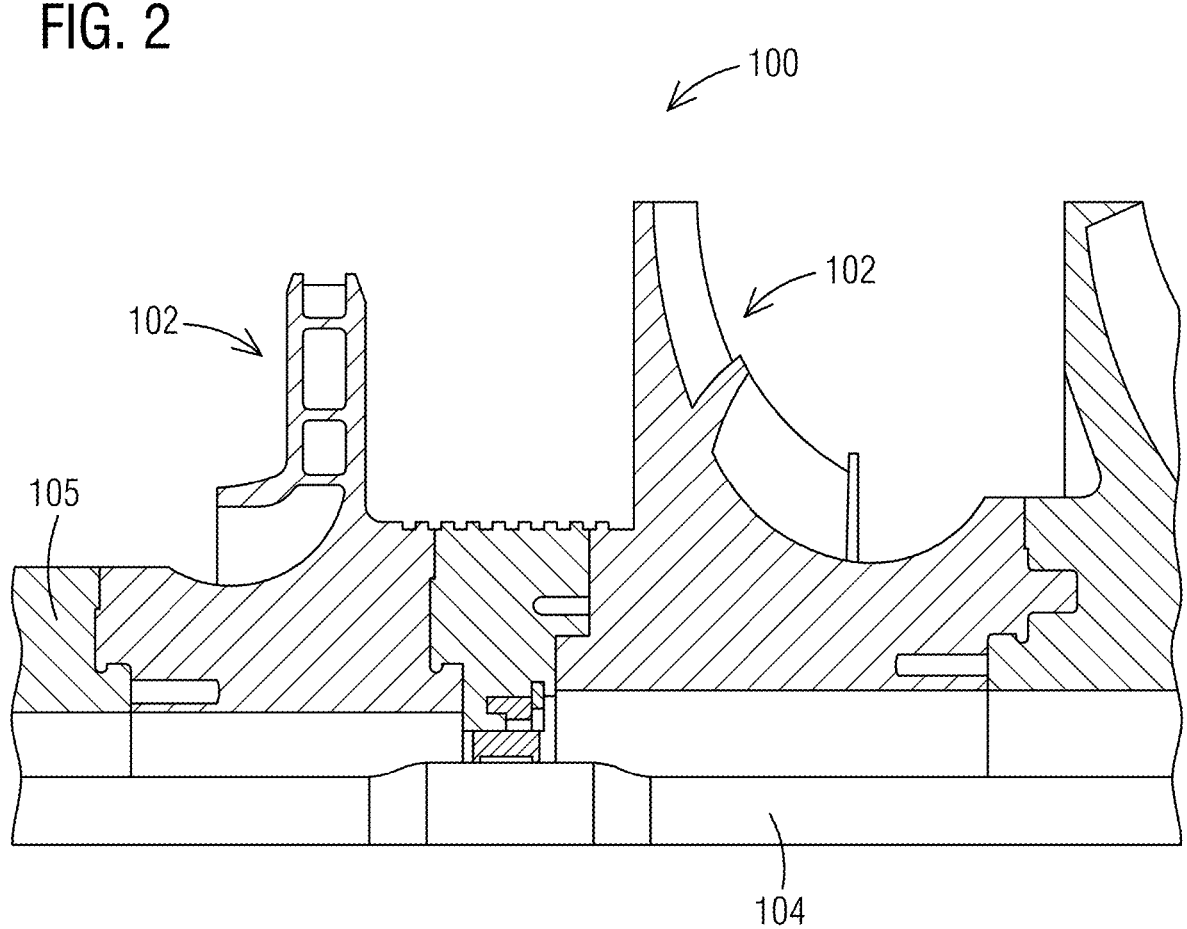
FIG. 2 is a fragmentary cross-sectional view showing a tie bolt where the impeller bodies are disposed.

In one example embodiment, a plurality of impeller bodies 102 is stacked adjacent one another on a tie bolt 104 (FIG. 2). For simplicity of illustration, just two impeller bodies 102 are shown in FIG. 1. In one example embodiment, as elaborated in greater detail below, a respective coupling joint 106 is defined by respective adjacent impeller bodies of the plurality of impeller bodies 102 to interconnect and transmit torque between the adjacent impeller bodies.

In one embodiment, a rotor shaft 105 (FIG. 2) may be fixed to one end of tie bolt 104. A second rotor shaft (not shown) may be fixed to the other end of the tie bolt. The rotor shafts may be referred to in the art as stub shafts. It will be appreciated that in certain embodiments more than two rotor shafts may be involved. Without limitation, the coupling techniques described herein in connection with coupling joints 106 may be used for interconnecting to one another: adjacent impeller bodies, an impeller body to a rotor shaft; or adjacent rotor shafts. That is, although the description below focuses on interconnecting and transmitting torque between adjacent impeller bodies, in general such coupling joints may be used equally effective for interconnecting and transmitting torque between any of various rotatable components associated with the rotor structure of the turbomachine, such as between an impeller body and an adjacent rotor shaft, etc. It will be further appreciated that disclosed embodiments may be used without limitation regardless of the specific arrangement of the impeller bodies, such as may involve a straight-through arrangement of the impeller bodies, or a back-to-back arrangement of the impeller bodies.

In one example embodiment, as schematically shown in FIG. 1, each respective coupling joint may be defined by a pair of corresponding axially engaging faces 108 that may extend between a radially outer diameter (do) and a radially inner diameter (di). In one example embodiment, the radially outer diameter (do) of the pair of corresponding axially engaging faces 108 may constitute a radially outermost diameter of the respective coupling joint 106. The pair of corresponding axially engaging faces 108 extending to a location that constitutes the radially outermost diameter of the respective coupling joint 106 is conducive to improved rotor bending stiffness, and overall improvement of the rotodynamic performance of the rotor structure.

Figure 4:
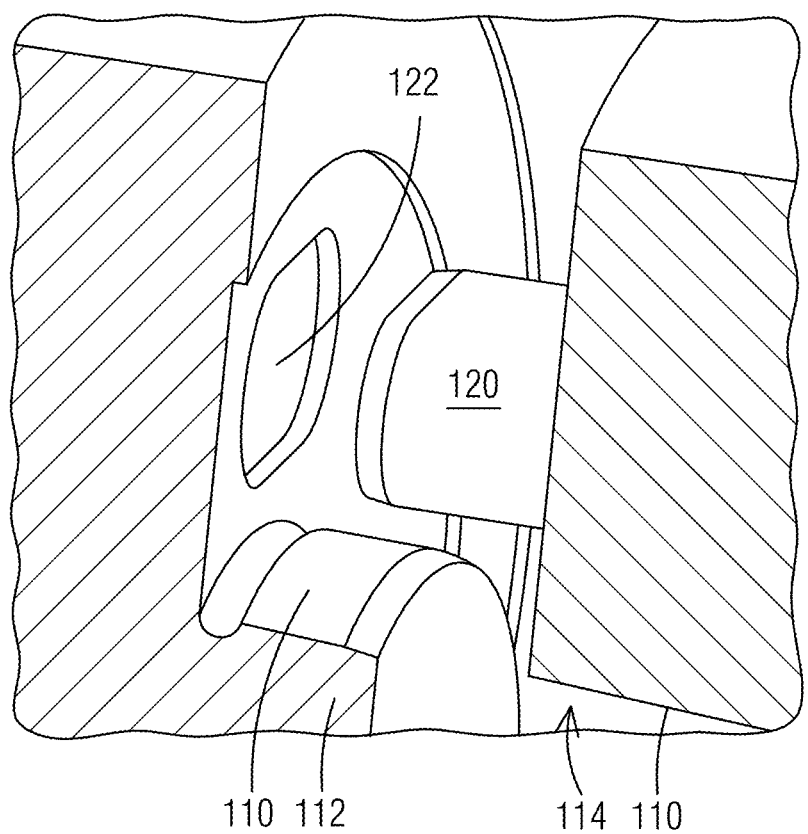
FIG. 4 is a fragmentary isometric view of certain structural features that may be arranged in combination to define a torque transmitting arrangement between the respective adjacent impeller bodies.

As further schematically shown in FIG. 1, in one example embodiment, the respective coupling joint 106 may be further defined by a pair of corresponding radially engaging faces 110. As may be better appreciated in FIG. 4, one of the faces of the pair of corresponding radially engaging faces 110 may be defined by an axial projection 112 from one of the adjacent impeller bodies and the other one of the faces of the pair of corresponding radially engaging faces 110 may be defined by an axially extending bore 114 in the other one of the adjacent impeller bodies. The axially extending bore 114 is configured to receive the axial projection 112. It will be appreciated that the pair of corresponding radially engaging faces 110 forms a coupling pilot fit between the respective adjacent impeller bodies 102.

In one example embodiment, a torque transmitting arrangement 116 is further defined by the respective adjacent impeller bodies 102. As schematically shown in FIG. 1, the torque transmitting arrangement 116 is interposed between the pair of corresponding axially engaging faces 108 and the pair of corresponding radially engaging faces 110. In one embodiment, a small radial gap or clearance may be located between the pair of corresponding axially engaging faces 108 and the pair of corresponding radially engaging faces 110.

Figure 3:
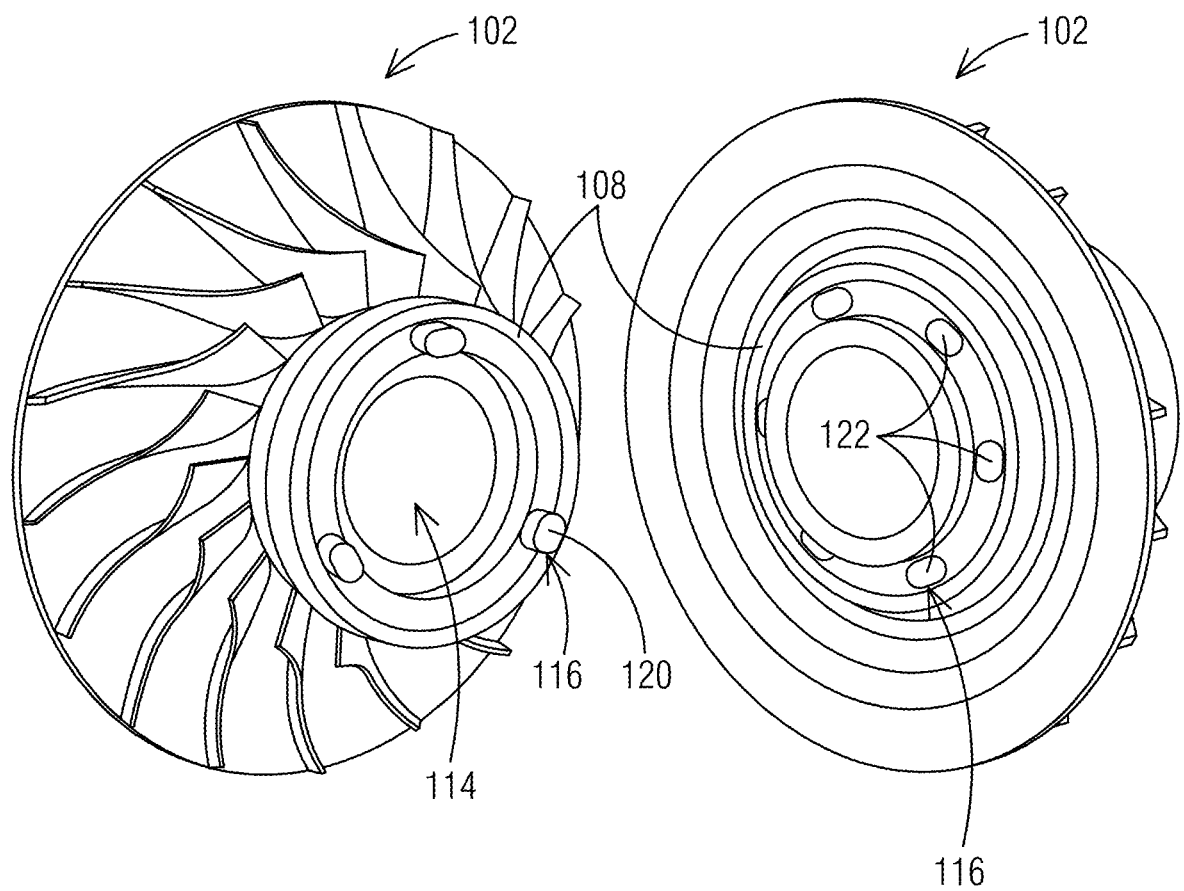
FIG. 3 are isometric views of mutually facing features of adjacent impeller bodies that in combination form a coupling joint to couple to one another the respective adjacent impeller bodies and transmit torque between the adjacent impeller bodies of the turbomachine.

As may be better appreciated in FIG. 3, the torque transmitting arrangement 116 comprises a plurality of circumferentially elongated tabs 120 projecting from one of the adjacent impeller bodies 102 and a plurality of apertures 122 each respectively configured to receive a respective elongated tab 120 of the plurality of circumferentially elongated tabs. In one example embodiment, the plurality of circumferentially elongated tabs 120 and the plurality of apertures 122 is each spaced apart over a circumference of the torque transmitting arrangement 116.

In one example embodiment, the number of apertures 122 may be higher relative to the number of circumferentially elongated tabs. This arrangement is conducive to facilitate flexible handling of alignment tolerances between the respective apertures 122 and the respective elongated tabs 120. For example, this would allow finer clocking intervals between respective apertures 122 and the respective circumferentially elongated tabs 120 and provides more flexibility for finding additional angular positional options for appropriately interconnecting the respective apertures 122 and the respective circumferentially elongated tabs 120 compared to an arrangement where the number of circumferentially elongated tabs 120 is equal to the number of respective apertures 122.

Figure 5:
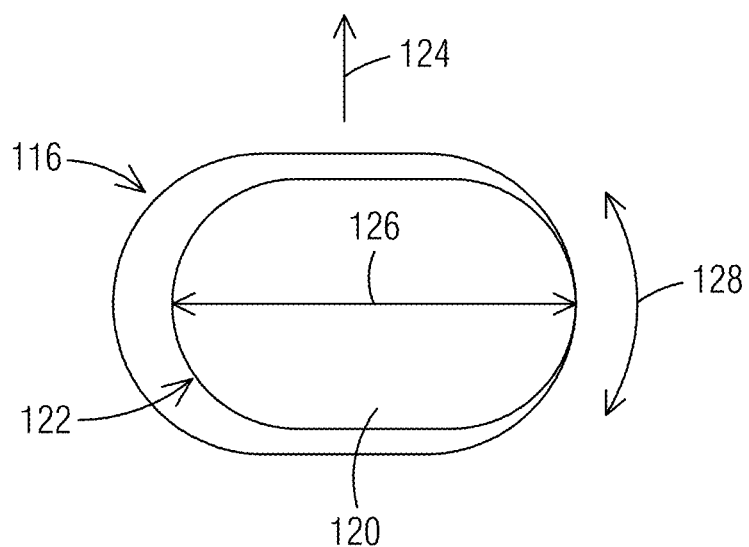
FIG. 5 is a diagram for conceptualizing the nature of the engagement formed between corresponding features of the torque transmitting arrangement.

As shown in FIG. 5, each circumferentially elongated tab 120 has a cross section (e.g., a non-circular cross section with the circumferential elongation (schematically represented by twin-headed arrow 126) configured to increase shear area relative to, for example, a circular area for a given thickness along a radial direction (schematically represented by arrow 124) of the torque transmitting arrangement 116. In one example embodiment, each respective circumferentially elongated tab 120 is configured to provide surface engagement at an arc segment (schematically represented by curving arrow 128) of the respective circumferentially elongated tab 120 with a corresponding surface of the respective receiving aperture 122. This arrangement is effective to inhibit centering effects that could otherwise arise between respective adjacent impeller bodies 102 if, for example, the receiving apertures 122 did not have a cross section having a circumferential elongation that matches the circumferentially elongated tab 120. It will be appreciated that the centering functionality between the respective adjacent impeller bodies 102 may be achieved by way of the radially engaging faces 110.

Figure 6:
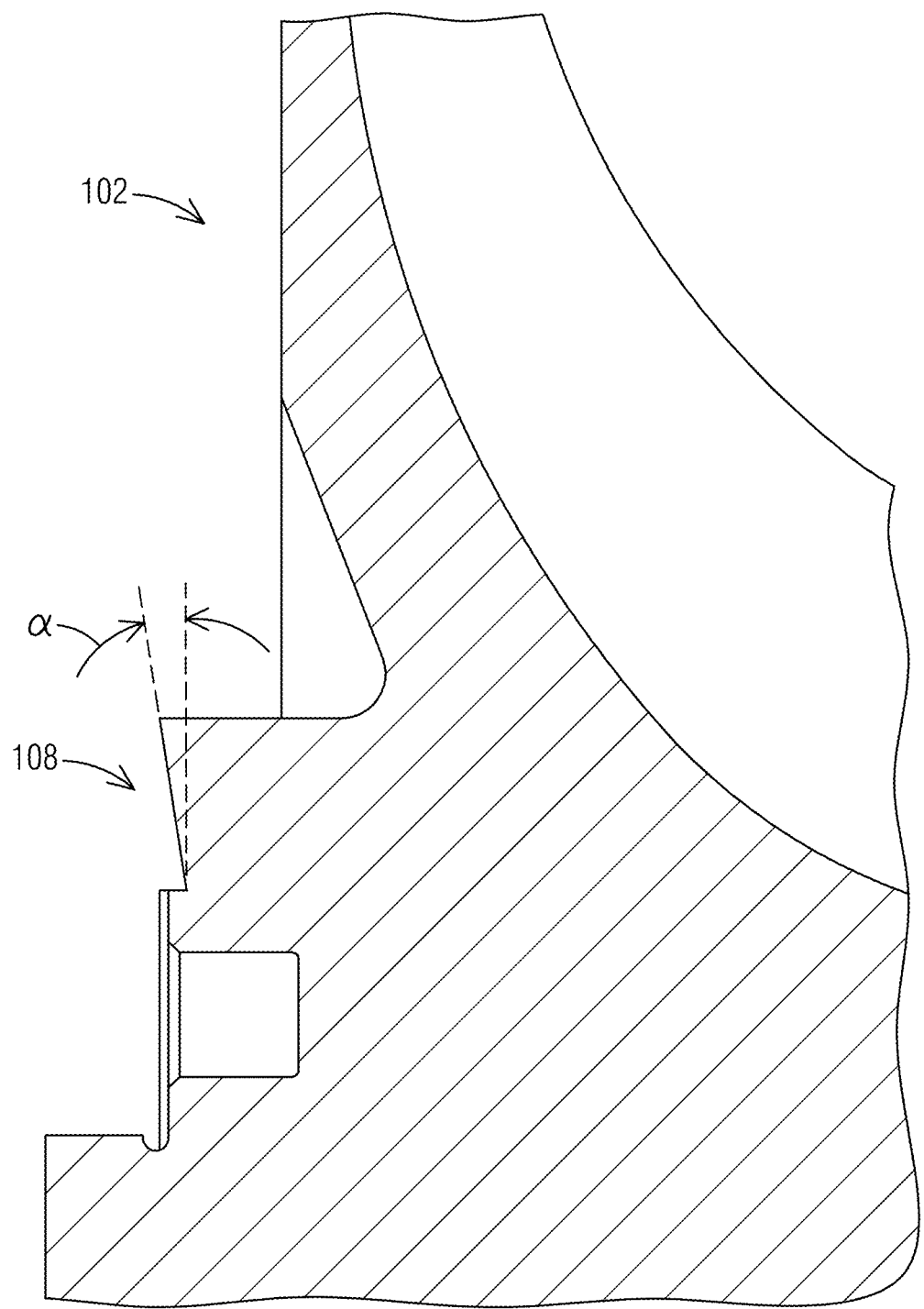
FIG. 6 is a fragmentary cross-sectional view showing one axially engaging face of the coupling joint with a taper.

In one example embodiment, as shown in FIG. 6, a respective one of the pair of corresponding axially engaging faces 108 has a taper (schematically represented by angle α) conducive to a relatively more uniform face contact pressure between the pair of corresponding axially engaging faces as one travels toward the radially outer diameter of the coupling joint. For example, as the rotor rotates, the heel portion 102' (FIG. 1) of a given impeller body tends to radially grow more than the toe portion 102" (FIG. 1) of an adjacent impeller body, and the taper may be arranged to inhibit the axially engaging faces 108 from separating at the location corresponding to the radially outer diameter (do).

Figure 7:
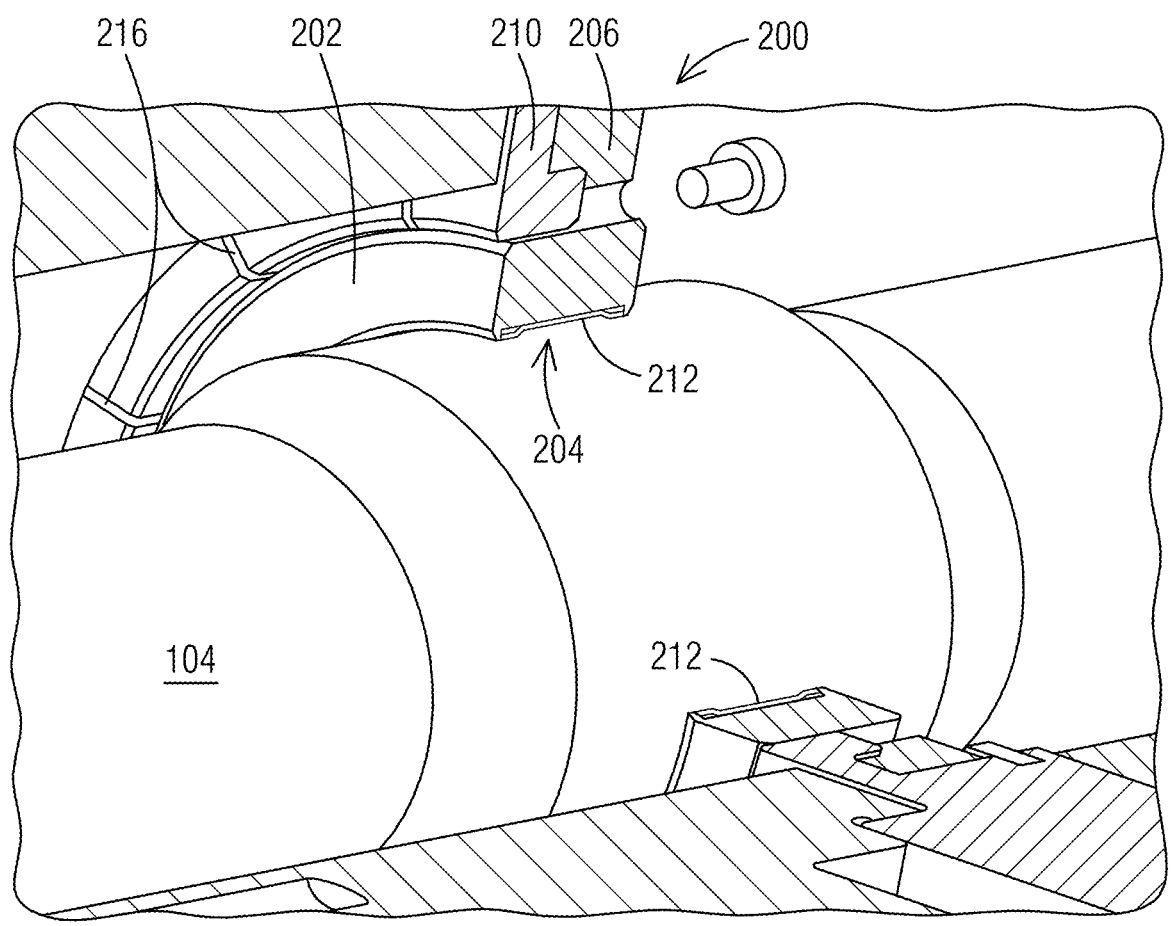
FIGS. 7 and 8 are respective isometrics showing mutually opposite views of a two-piece assembly located at the midspan section of the tie bolt in an exemplary back-to-back configuration of the impeller bodies.
Figure 8:
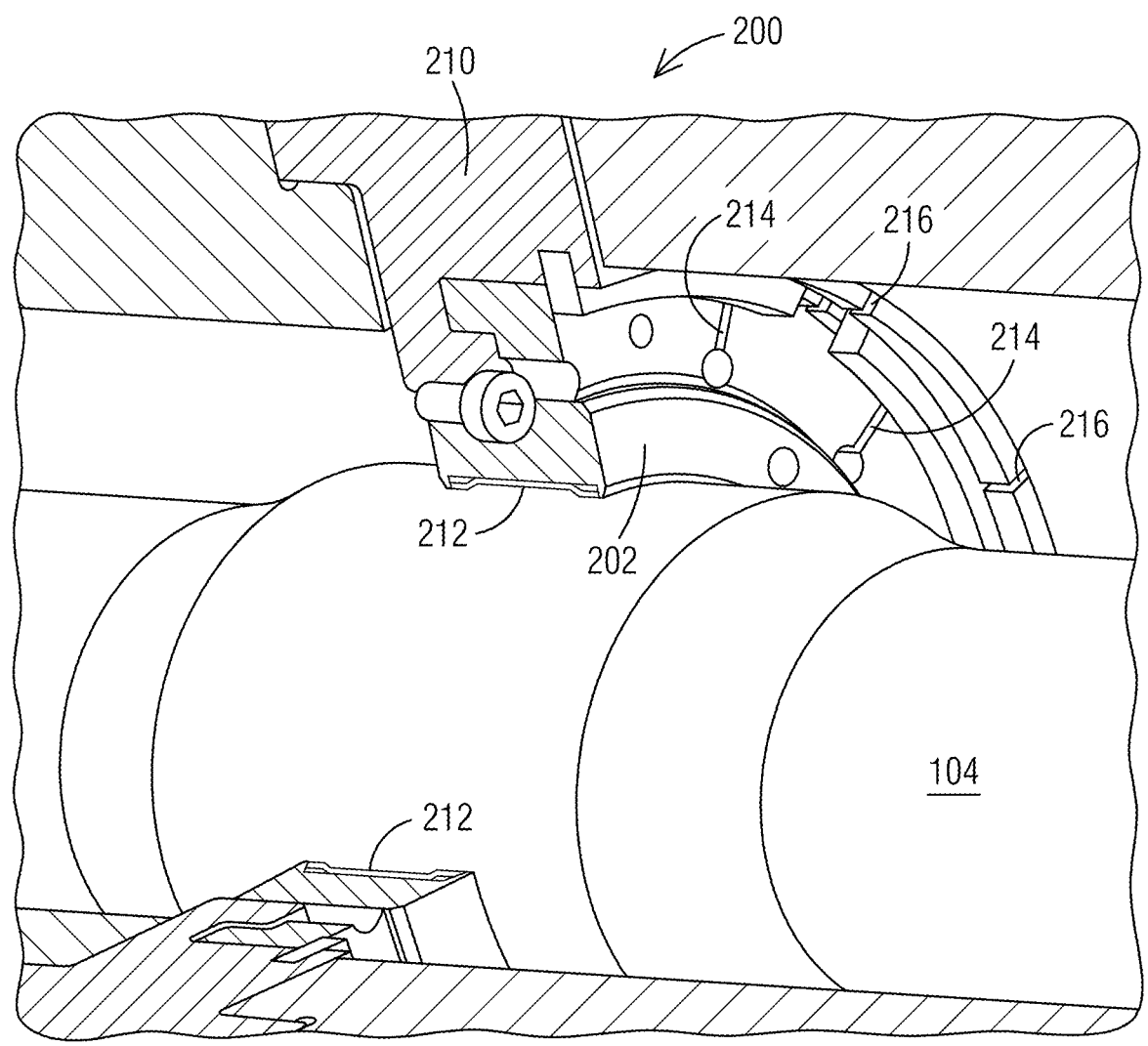

FIGS. 7 and 8 are respective isometrics showing mutually opposite views of an assembly 200 that may be located at the midspan section of the tie bolt 104 in an exemplary back-to-back configuration of the impeller bodies. In one example embodiment, assembly 200 includes a first subassembly 202 that defines a tolerance ring carrier having a radially-inner portion 204 disposed to engage the midspan section of the tie bolt. The tolerance ring carrier 202 has a radially-outward portion 206 connected to a second subassembly 210 that defines a division wall spacer. In one non-limiting embodiment, the tolerance ring carrier 202 is affixed to the division wall spacer by way of a pilot fit.

As further illustrated, the tolerance ring carrier 202 has a spring biasing mechanism 212 arranged to adjust radial stiffness at the midspan section of the tie bolt 104. The spring biasing mechanism may be selected from any of various modalities of biasing mechanisms, such as a tolerance ring, a wave spring, a C-shaped spring, and a leaf spring.

In one example embodiment, the tolerance ring carrier 202 comprises a first plurality of slots 214 (FIG. 8) extending radially inward from an outer diameter of the tolerance ring carrier. Additionally, the division wall spacer 210 comprises a second plurality of slots 216 extending radially outward from an inner diameter of the division wall spacer 210. In one non-limiting embodiment, the first plurality of slots 214 is spaced apart over a circumference of the tolerance ring carrier, and the second plurality of slots is spaced apart over a circumference the division wall spacer 210. In one example embodiment, each respective slot 214 of the first plurality of slots is circumferentially interposed between adjacent slots 216 of the second plurality of slots. The second plurality of slots 216 extending radially outward from an inner diameter of the division wall spacer 210 effectively allow division wall spacer 210 to grow as if it had a larger bore. Similarly, the first plurality of slots 214 extending radially inward from an outer diameter of the tolerance ring carrier is effective to accommodate additional radial growth by the tolerance ring carrier 202.

It will be appreciated that the two-subassembly design that forms assembly 200 is configured so that, for example, the radial growth of the division wall spacer 210 at the outer diameter matches the radial growth of adjacent impeller bodies. Additionally, the radial growth of the tolerance ring carrier 202 should be selected not to exceed the allowable preload range of the spring biasing mechanism 212.

In operation, when the tie bolt has been appropriately subjected to a high level of tension to hold together the impeller bodies, the pair of corresponding axially engaging faces 108 (FIG. 1) form a compressed joint between one another. The compressed joint is effective to define a seal between the pair of corresponding axially engaging faces 108 at each respective coupling joint 106 to inhibit leakage of the process fluid being processed in the compressor section of the turbomachine.

In operation, the mutually engaging axial faces may be appropriately controlled for parallelism, flatness, and squareness, which is conducive to prevent angular misalignment and allows a rotor design having a relatively larger rotor diameter and in turn increased rotor stiffness.

As noted above, in operation the mutually engaging faces effectively form a metal-to-metal seal that inhibits the process fluid from entering the tie bolt area and in turn allows eliminating discrete sealing component, such as sleeves with O-rings or similar discrete sealing arrangements.

In operation, the torque transmitting arrangement with elongated tabs provides technical advantages, for example, at least over certain known designs involving dowel pins, which in turn involve burdensome precision jigs for installation. Moreover, our elongated tabs permit a relatively larger cross sectional shear area compared to the shear cross sectional provided, for example, by dowel pins (e.g., circular cross section) that comparatively have a reduced shear area and would reduce the amount of torque that can be transmitted through the rotor shaft of a given turbomachine. Accordingly, disclosed embodiments are believed to provide more flexibility in connection with drive through applications, for example.

Although at least one exemplary embodiment of the present disclosure has been described in detail, those skilled in the art will understand that various changes, substitutions, variations, and improvements disclosed herein may be made without departing from the scope of the disclosure in its broadest form.

None of the description in the present application should be read as implying that any particular element, step, act, or function is an essential element, which must be included in the claim scope. The scope of patented subject matter is defined only by the allowed claims. Moreover, none of these claims are intended to invoke a means plus function claim construction unless the exact words "means for" are followed by a participle.

What is claimed is:

1. A turbomachine having a rotor structure comprising:
   a tie bolt;
   a plurality of impeller bodies stacked adjacent to one another on the tie bolt;
   a respective coupling joint defined by respective adjacent impeller bodies of the plurality of impeller bodies to couple to one another the respective adjacent impeller bodies, the respective coupling joint defined by:
      a pair of corresponding axially engaging faces extending between a radially outer diameter and a radially inner diameter, wherein the radially outer diameter of the pair of corresponding axially engaging faces comprises a radially outermost diameter of the respective coupling joint; and
      a pair of corresponding radially engaging faces, one of the faces of the pair of corresponding radially engaging faces defined by an axial projection from one of the adjacent impeller bodies and the other one of the faces of the pair of corresponding radially engaging faces defined by an axially extending bore in the other one of the adjacent impeller bodies, the axially extending bore configured to receive the axial projection; and
   a torque transmitting arrangement further defined by the respective adjacent impeller bodies of the plurality of impeller bodies, the torque transmitting arrangement interposed between the pair of corresponding axially engaging faces and the pair of corresponding radially engaging faces, wherein the pair of corresponding axially engaging faces and the pair of corresponding radially engaging faces form a coupling pilot fit between the respective adjacent impeller bodies' wherein the torque transmitting arrangement comprises a plurality of circumferentially elongated tabs projecting from one of the adjacent impeller bodies and a plurality of apertures each respectively configured to receive a respective elongated tab of the plurality of circumferentially elongated tabs.

2. The turbomachine of claim 1, wherein each circumferentially elongated tab has a cross section configured to increase shear area relative to a circular area for a given thickness along a radial direction of the torque transmitting arrangement.

3. The turbomachine of claim 2, wherein each respective circumferentially elongated tab is configured to provide surface engagement at an arc segment of a respective circumferentially elongated tab with a corresponding surface of the respective receiving aperture.

4. The turbomachine of claim 1, wherein the plurality of circumferentially elongated tabs and the plurality of apertures is each spaced apart over a circumference of the torque transmitting arrangement.

5. The turbomachine of claim 4, wherein the number of apertures is higher relative to the number of circumferentially elongated tabs.

6. The turbomachine of claim 1, wherein the circumferentially elongated tabs is each integrally constructed to form a singular piece with the impeller body from which the circumferentially elongated tabs project.

7. The turbomachine of claim 1, wherein a respective one of the pair of corresponding axially engaging faces has a taper configured to inhibit the axially engaging faces from separating at the radially outer diameter during operation of the turbomachine.

8. The turbomachine of claim 1, wherein the plurality of impeller bodies comprises a back-to-back arrangement of the impeller bodies.

9. The turbomachine of claim 8, further comprising an assembly located at the midspan section of the tie bolt, the assembly comprising a first subassembly that defines a tolerance ring carrier having a radially-inner portion disposed to engage the midspan section of the tie bolt, the tolerance ring carrier having a radially-outward portion connected to a second subassembly that defines a division wall spacer.

10. The turbomachine of claim 9, wherein the tolerance ring carrier has a spring biasing mechanism arranged to adjust radial stiffness at the midspan section of the tie bolt.

11. The turbomachine of claim 10, wherein the spring biasing mechanism is selected from the group consisting of a tolerance ring, a wave spring, a C-shaped spring, and a leaf spring.

12. The turbomachine of claim 10, wherein the tolerance ring carrier comprises a first plurality of slots extending radially inward from an outer diameter of the tolerance ring carrier.

13. The turbomachine of claim 12, wherein the division wall spacer comprises a second plurality of slots extending radially outward from an inner diameter of the division wall spacer.

14. The turbomachine of claim 13, wherein the first plurality of slots is spaced apart over a circumference of the tolerance ring carrier, and wherein the second plurality of slots are spaced apart over a circumference the division wall spacer, wherein each respective slot of the first plurality of slots is circumferentially interposed between adjacent slots of the second plurality of slots.

15. The turbomachine of claim 1, wherein the plurality of impeller bodies comprises a straight-through arrangement of the impeller bodies.

16. The turbomachine of claim 1, wherein the plurality of impeller bodies defines a compressor section of the turbomachine, and wherein the pair of corresponding axially engaging faces form a compressed joint between one another, the compressed joint effective to define a seal between the pair of corresponding axially engaging faces to inhibit leakage of a process fluid being processed in the compressor section of the turbomachine.

17. The turbomachine of claim 1, wherein the turbomachine is a centrifugal compressor.

18. The turbomachine of claim 1, further comprising a rotor shaft located at one end of the tie bolt, and a respective coupling joint defined by the rotor shaft and an impeller body adjacent to the rotor shaft, wherein the further respective coupling joint is arranged to couple to one another the respective impeller body to the rotor shaft.

\* \* \* \* \*